United States Patent
Akagawa

(10) Patent No.: US 10,761,017 B2
(45) Date of Patent: Sep. 1, 2020

(54) GAS DETECTION SYSTEM, GAS DETECTION METHOD AND PROGRAM

(71) Applicant: NEC Corporation, Minato-ku, Tokyo (JP)

(72) Inventor: Takeshi Akagawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/490,941

(22) PCT Filed: Mar. 8, 2018

(86) PCT No.: PCT/JP2018/009024
§ 371 (c)(1),
(2) Date: Sep. 4, 2019

(87) PCT Pub. No.: WO2018/164229
PCT Pub. Date: Sep. 13, 2018

(65) Prior Publication Data
US 2020/0018693 A1  Jan. 16, 2020

(30) Foreign Application Priority Data

Mar. 9, 2017  (JP) ................ 2017-045090

(51) Int. Cl.
*G01N 21/39* (2006.01)
*G01N 21/3504* (2014.01)
(Continued)

(52) U.S. Cl.
CPC ....... *G01N 21/3504* (2013.01); *G01N 21/359* (2013.01); *G01N 21/3554* (2013.01); *G01N 21/39* (2013.01); *G01N 2021/7773* (2013.01)

(58) Field of Classification Search
CPC ...... G01N 25/68; G01N 25/66; G01N 27/121; G01N 27/127; G01N 25/56; G01N 25/64;
(Continued)

(56) References Cited

U.S. PATENT DOCUMENTS 4,216,669 A * 8/1980 Harding, Jr. .......... G01N 25/68
374/20
5,468,961 A * 11/1995 Gradon ................. A61M 16/16
250/343

(Continued)

FOREIGN PATENT DOCUMENTS

| JP | 6-148071 A | 5/1994 |
| JP | 8-220252 A | 8/1996 |

(Continued)

OTHER PUBLICATIONS

Nakamura et al., "Methane Gas Sensing System by Optical Fiber", Abstracts of Conference of the Japan Institute of Energy, Aug. 2, 2007, pp. 52-53 (total 2 pages).
(Continued)

*Primary Examiner* — Michael P Stafira

(57) ABSTRACT

A gas detection system, comprising: a humidity measuring apparatus that measures humidity; a transmitting apparatus that includes a light source which emits an optical signal of a plurality of wavelengths; and a receiving apparatus including: a light detection part that receives the optical signal from the transmitting apparatus; a discrimination part that determines whether or not condensation exists in at least one region of regions where the optical signal passes, based on the humidity measured by the humidity measuring apparatus and a light intensity of the optical signal received by the light detection part.

10 Claims, 12 Drawing Sheets

(51) Int. Cl.
*G01N 21/3554* (2014.01)
*G01N 21/359* (2014.01)
*G01N 21/77* (2006.01)

(58) Field of Classification Search
CPC ........... G01N 27/048; G01N 2021/435; G01N 2021/7776; G01N 2021/7779; G01N 21/27; G01N 21/359; G01N 21/41; G01N 21/63; G01N 25/02; G01N 11/04; G01N 17/002; G01N 19/10; G01N 2011/002; G01N 2021/0314; G01N 2021/399; G01N 2021/7773; G01N 21/314; G01N 21/3504; G01N 21/3554; G01N 21/3563; G01N 21/39; G01N 21/43; G01N 21/552; G01N 21/85; G01N 2201/129; G01N 2291/021; G01N 25/18; G01N 27/045; G01N 27/125; G01N 27/18; G01N 27/22; G01N 27/223; G01N 27/225; G01N 27/228; G01N 27/4141; G01N 27/416; G01N 33/225; G01N 33/383; G01N 33/442; G01N 9/36; G01J 5/025; G01J 2005/0077; G01J 5/00; G01J 5/0096; G01J 5/02; G01J 5/0025; G01J 5/047; G01J 1/02; G01J 1/0252; G01J 2005/123; G01J 5/0265; G01J 5/028; G01J 5/0846; G01J 5/0896; G01J 5/14; G01J 5/20; G02B 27/006; G02B 7/008; G02B 7/1815; G02B 21/28; G02B 21/362; G01B 11/026; G01B 11/0608
See application file for complete search history.

(56) References Cited

U.S. PATENT DOCUMENTS

| 9,874,518 | B2  | 1/2018  | Sato et al. |                       |
|-----------|-----|---------|-------------|-----------------------|
| 2008/0088821 | A1* | 4/2008  | Hurvitz     | G01N 21/39<br>356/51 |
| 2010/0296079 | A1* | 11/2010 | Chiarello   | G01N 21/43<br>356/72 |
| 2014/0049774 | A1* | 2/2014  | Horii       | G01N 21/94<br>356/237.3 |
| 2014/0151538 | A1* | 6/2014  | Syed        | G01N 21/15<br>250/222.1 |
| 2017/0067825 | A1  | 3/2017  | Sato et al. |                       |

FOREIGN PATENT DOCUMENTS

| JP | 9-43141       | A  | 2/1997  |
| JP | 10-96699      | A  | 4/1998  |
| JP | 2012-108095   | A  | 6/2012  |
| JP | 2012-202930   | A  | 10/2012 |
| JP | 2013-164336   | A  | 8/2013  |
| JP | 2013-250089   | A  | 12/2013 |
| WO | 2015/163074   | A1 | 10/2015 |
| WO | 2016/079259   | A1 | 5/2016  |

OTHER PUBLICATIONS

International Search Report for PCT/JP2018/009024 dated May 29, 2018 [PCT/ISA/210].

Written Opinion for PCT/JP2018/009024 dated May 29, 2018 [PCT/ISA/237].

* cited by examiner

FIG. 5

| HUMIDITY / ABSORBANCE INFORMATION | |
|---|---|
| HUMIDITY | ABSORBANCE OF WATER |
| 0% | B0 |
| 1% | B1 |
| 99% | B99 |
| 100% | B100 |

GAS DETECTION SYSTEM, GAS DETECTION METHOD AND PROGRAM

FIELD

Reference to Related Application

This application is a National Stage Entry of PCT/JP2018/009024 filed on Mar. 8, 2018, which claims priority from Japanese Patent Application 2017-045090 filed on Mar. 9, 2017, the contents of all of which are incorporated herein by reference, in their entirety. The present invention relates to a gas system, a gas detection method, and a program. In particular, the present invention relates to a gas detection system that detects gas concentration based on the attenuation of the transmission amount of an optical signal, and a gas detection method, and a program.

BACKGROUND

In recent years, emission of carbon dioxide, which causes environmental destruction such as air pollution and global warming, has become a problem. There are also concerns about a risk of gas leaks and explosions accompanied by aging of infrastructure. Under such circumstances, an importance of sensor(s) for detecting gas and gas detection system that pose a danger such as environmental load gas or explosion causing environmental destruction is increasing. In particular, in recent years, consumption of natural gas, which emits less carbon dioxide than coal and petroleum, has increased. With the increase of consumption of natural gas, the detection of gas leakage in a natural gas distribution network is regarded as important.

Here, the main component of natural gas is methane molecule (CH4). Semiconductor type sensor(s) are often used to detect methane molecules. Semiconductor type sensor can detect, as a gas concentration value, a change in resistance that occurs when the metal oxide semiconductor contacts gas. Furthermore, the semiconductor sensor(s) is not only for flammable gas, there is an advantage that it is possible to detect the various gases such as toxic gas.

However, since the power supply to a sensor part is needed for use of the semiconductor type sensor, the sensor part (sensor part which detects gas) is required to have an explosion-proof structure. Also, for reasons such as the sensor part has movable positions, administrative tasks such as requirement of periodic inspection and calibration work or taking time to gas detection because of measuring by contacting the gas, which are counted as problems.

Thus, for a safety use of semiconductor type sensor, there is much of problems and requirements, so that alternative means of semiconductor type sensor have been studied. For example, there are sensors using a phenomenon in which a light transmitting through gas is attenuated by infrared absorption, and gas detection systems using such sensors. In these gas detection systems, concentration by each kind of gas is estimated from absorption wavelength of light corresponding to the kind of gas and attenuation amount of the transmitted light.

Patent Literature 1 discloses a method of detecting gas concentrations at multiple locations. Patent Literature 1 discloses a multipoint gas concentration measurement method in which control method is simple and amount of optical fibers used may be small. Patent Literature 2 discloses a gas detection apparatus that detects gas at a plurality of locations. Non-Patent Literature 1 discloses an optical fiber type gas detection system.

In addition, Patent Literature 3 discloses a gas measurement apparatus, comprising a light source part and a light receiving part which are embedded in a same casing, and the light path is bent by 90 degrees. Patent Literature 4 discloses a gas analyzer, and describes that a partial pressure value is determined from a fluctuation amount of measurement light in gas to be measured. Patent Literature 5 discloses a gas analyzer and a technique to improve accuracy in detecting gas concentration using laser light.

CITATION LIST

Patent Literatures

PTL1: Japanese Patent Kokai No. H6-148071A
PTL2: Japanese Patent Kokai No. H9-043141A
PTL3: Japanese Patent Kokai No. H10-096699A
PTL4: Japanese Patent Kokai No. 2013-164336A
PTL5: Japanese Patent Kokai No. 2012-108095A
NPL1: Teruyuki Nakamura, "Methane Gas Sensing System by Optical Fiber", Abstracts of Conference of The Japan Institute of Energy, Aug. 2, 2007, pp. 52-53

SUMMARY

The disclosure of the above prior art Literatures is incorporated herein by reference thereto. The following analysis has been made by the inventors of the present invention.

There are also problems with gas detection systems that use light absorption in place of the semiconductor type sensors described above. Specifically, in a gas detection system using absorption of light, discrimination between a decrease in amount of a light received due to condensation in a sensor and a change in absorbance due to influence of humidity in a monitoring region is the problem. For example, a change in absorbance when a light transmitting surface or a light receiving surface with condensation is almost equal to a change in absorbance when a monitoring region of 100-meter length is measured based on the principle of light absorption under an environment of 70% humidity. Therefore, there is a possibility that a measured value of gas concentration in the monitoring region is incorrect, in a case where the light receiving surface has condensation.

Thus, the gas detection system using an absorbance of light, for example, when the gas concentration has changed, has to determine whether the change is caused by a decreased amount of light received due to condensation of the sensor surface, or by an influence of humidity in the monitoring region. The Patent Literatures and the Non-Patent Literature described above do not mention at all about determination of a difference between an influence of condensation on the sensor surface and that of humidity in the monitoring region.

It is an object of the present invention is to provide a gas detection system, a gas detection method, and a program that contribute to determine a difference between a change in absorbance caused by a decreased amount of light received due to condensation and by an influence of humidity in the monitoring region.

According to a first aspect of the present invention, there is provided a gas detection system, comprising: a humidity measuring apparatus that measures humidity; a transmitting apparatus that includes a light source which emits an optical signal of a plurality of wavelengths; a receiving apparatus including: a light detection part that receives the optical signal from the transmitting apparatus; a discrimination part that determines whether or not condensation exists in at least one region of regions where the optical signal passes, based on the humidity measured by the humidity measuring apparatus and a light intensity of the optical signal received by the light detection part.

According to a second aspect of the present invention, there is provided a gas detection method in a gas detection system, wherein the gas detection system comprises a humidity measuring apparatus that measures humidity, and a transmitting apparatus that includes a light source which emits an optical signal having a plurality of wavelengths, the method comprising: measuring humidity; receiving the optical signal from the transmitting apparatus; determining whether or not condensation exists in at least one region of regions where the optical signal passes, based on the humidity measured and a light intensity of the optical signal received.

According to a third aspect of the present invention, there is provided a computer readable non-transient recording medium storing a program, causing a computer to perform processing for a receiving apparatus that comprises a light detection part which receives an optical signal from a transmitting apparatus that comprises a light source emitting an optical signal of a plurality of wavelengths, the program comprising a processing of: determining whether or not condensation exists in at least one region of regions where the optical signal passes, based on a humidity measured by a humidity measuring apparatus, and a light intensity of the optical signal received by the light detection part.

According to each aspect of the present invention or the disclosure, a gas detection system, a gas detection method, and a program are provided, that contribute to determine a difference between a decrease in amount of light received due to condensation and a change in absorbance due to humidity in the monitoring region.

BRIEF DESCRIPTION OF THE DRAWINGS

FIG. 5 illustrates a figure to show an example of humidity/absorbance information to be stored in a storage part in a receiving apparatus.

First, an overview of one example embodiment will be described. The reference symbols of the drawings appended to this summary are added for the sake of convenience to each element as an example for aiding understanding, and the description of the summary is not intended to be limitative any way.

Figure 1:
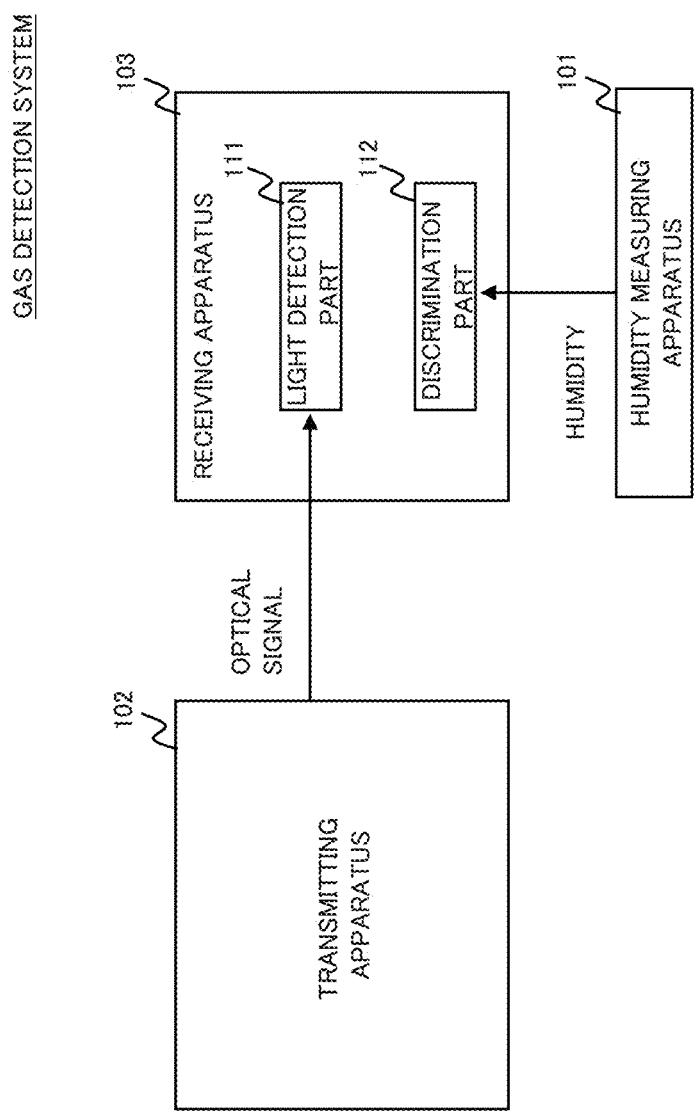
FIG. 1 illustrates a figure to explain an outline of one example embodiment.

A gas detection system according to one example embodiment comprises, a humidity measuring apparatus 101, a transmitting apparatus 102, and a receiving apparatus 103 (see FIG. 1). The humidity measuring apparatus 101 measures humidity in the vicinity of the transmitting apparatus 102 and the receiving apparatus 103. The transmitting apparatus 102 comprises a light source for emitting an optical signal having a plurality of wavelengths. The receiving apparatus 103 comprises, a light detection part 111 that receives the optical signal from the transmitting apparatus 102, and a discrimination part 112 that determines whether or not condensation exists in at least one region of regions the optical signal passes based on the humidity measured by the humidity measuring apparatus 101, and the light intensity of the optical signal received by the light detection part 111.

The receiving apparatus 103 determines whether or not condensation exists in a part of region of the detecting region (gas concentration monitoring region), in a case where an absorbance of water calculated from a light intensity of the received optical signal is different from an absorbance of water assumed by humidity at a time of measuring gas concentration. As a result, it is possible to determine whether the amount of received light is reduced (the gas concentration measurement value is reduced) due to condensation or the amount of the received light has changed due to the change of humidity in the monitoring region. That is, by determining whether or not condensation exists, and by using the result, accurate gas concentration measurement can be realized.

Hereinafter, a specific example embodiment will be described in more detail with reference to the drawings. In each example embodiment, the same reference numeral is given to the same component, and the description is omitted. Also, connection lines between blocks in each figure include both bidirectional and unidirectional directions. A one-way arrow indicates schematically a flow of a main signal (data), and does not exclude the bidirectional. Further, in a circuit diagram shown in the present disclosure, a block diagram, an internal configuration diagram and a connection diagram etc., there exist input terminal and output terminal respectively representing input port and output port for each connected line, which are not shown explicitly. The same applies to input and output interface, too.

A FIRST EXAMPLE EMBODIMENT

A first example embodiment will be described in more detail using the drawings.

Description of Configuration

Figure 2:
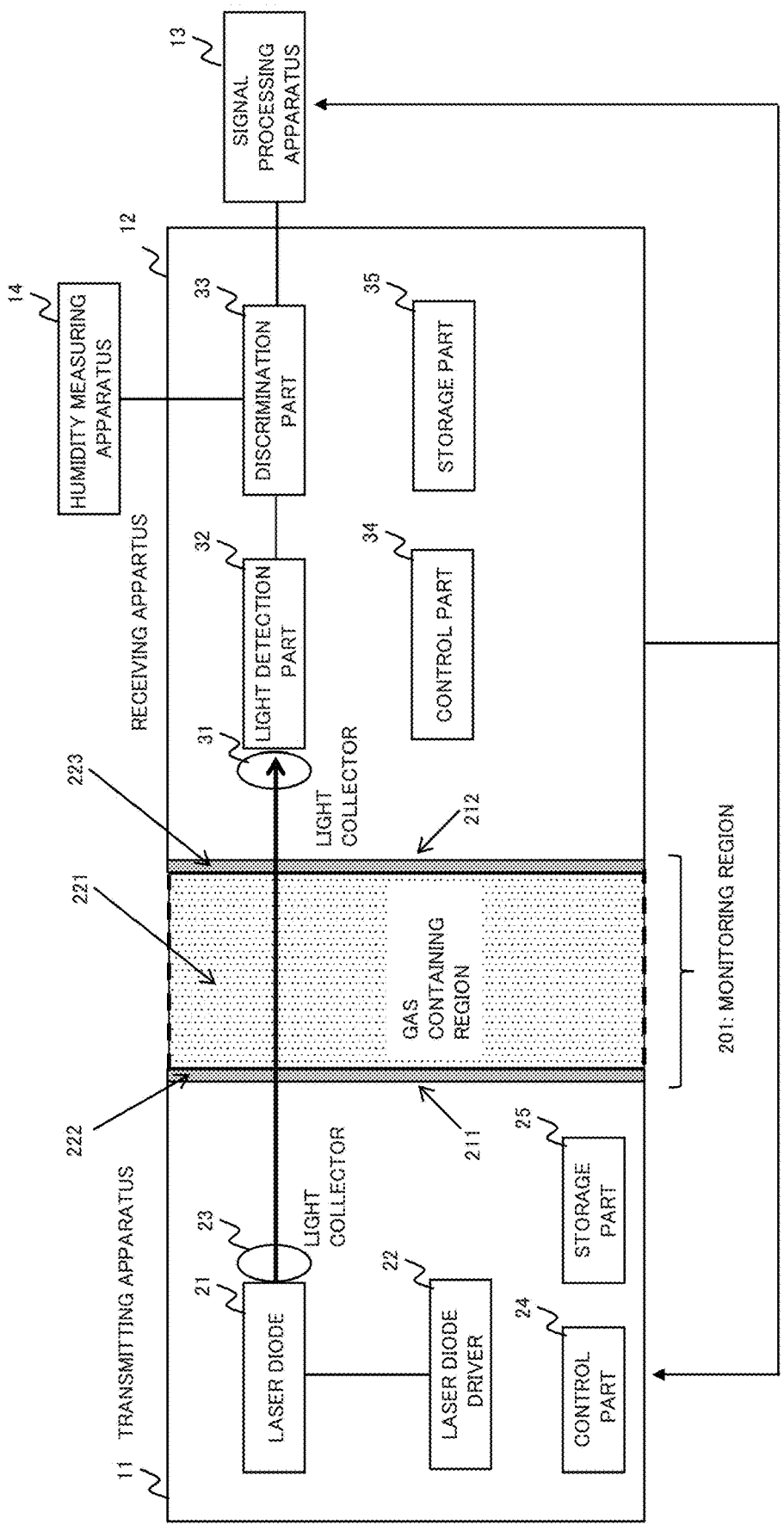
FIG. 2 illustrates a block diagram to show a configuration of a gas detection system concerning to a first example embodiment.

FIG. 2 illustrates a block diagram to show a configuration example of a gas detection system according to a first example embodiment. Referring to FIG. 2, a gas detection system 10 comprises a transmitting apparatus 11, a receiving apparatus 12, a signal processing apparatus (may be termed as "signal processor") 13 and a humidity measuring apparatus 14.

The transmitting apparatus 11 transmits an optical signal to the receiving apparatus 12.

The receiving apparatus 12, by receiving an optical signal transmitted from the transmitting apparatus 11, outputs a detection signal of gas concentration in a monitoring region disposed between the transmitting apparatus 11 and the receiving apparatus 12 to the signal processing apparatus 13. Also, the receiving apparatus 12 receives the optical signal transmitted from the transmitting apparatus 11, determines whether or not condensation exists in at least one region of regions through which the optical signal passes based on a humidity measured by the humidity measuring apparatus and a light intensity of the received optical signal. Specifically, the receiving apparatus 12 determines whether or not condensation exists on a transmitting surface 211 or a receiving surface 212 that is disposed in contact with a monitoring region 201 in FIG. 2, and notifies the result to the transmitting apparatus 11 and to the signal processing apparatus 13.

The signal processing apparatus 13 is an apparatus that detects (measures) gas concentration in the monitoring region 201 based on the signal from the receiving apparatus 12. Specifically, the signal processing apparatus 13 measures concentration of a predetermined kind of gas, based on information (an electrical signal converted from the optical signal) corresponding to (or responsive to) the optical signal having an absorption wavelength of a gas (wavelength to be absorbed by a gas).

The humidity measuring apparatus 14 is disposed in the vicinity of the transmitting apparatus 11 and/or the receiving apparatus 12, and measures a humidity of an environment surrounding these apparatuses. For example, the humidity measuring apparatus 14 may be commonly used hygrometer, or may be any type or method as long as ambient humidity can be monitored, such as bimetal hygrometer or digital hygrometer.

Next, a configuration of the transmitting apparatus 11 will be described. The transmitting apparatus 11 comprises a laser diode 21, a laser diode driver 22, a light collector 23, a control part 24 and a storage part 25.

Laser diode 21 is a light source emitting an optical signal from the transmitting apparatus 11. Laser diode 21 is configured to emit an optical signal(s) having a plurality of different wavelengths, and be able to emit optical signal(s) having at least two or more wavelengths. More specifically, laser diode 21 is configured to emit the optical signal(s) having the absorption wavelength(s) of a predetermined kind of gas contained in atmosphere (an optical signal for measuring gas concentration), and the optical signal having an absorption wavelength which has a large amount of absorbance of water (an optical signal for measuring the absorbance of water). The laser diode 21 is controlled by the laser diode driver 22. Further, emitting angle of the optical signal emitted from the laser diode 21 is controlled by the light collector 23.

It is desirable that the transmitting surface 211 of the transmitting apparatus 11 (the surface disposed in contact with the monitoring region 201) is sealed with glass or the like. By sealing the transmitting surface 211 with glass, it is possible to prevent a change of location-ship relative to the laser diode 21, and the light collector 23 caused by a contact from exterior, and to prevent status change of the transmitting surface of the laser diode 21 and the light collector 23 caused by external situation (or ambient condition).

The control part 24 is a means that controls the transmitting apparatus 11 as a whole that is configured by an arithmetic unit such as CPU (Central Processing Unit). One of functions of the control part 24 is a function of adjusting direction of the optical signal transmitted from the transmitting apparatus 11. That is, the control part 24 works as an optical axis control part. Specifically, the control part 24 that is connected to the light collector 23 controls the direction of the optical signal to be transmitted by using actuators configured with motors and the like (not shown).

The control part 24 is also a means that executes instructions changing operating mode(s) of the transmitting apparatus 11. Details will be described later, however, the gas detection apparatus 10 has two operating modes, one of which is a "pre-measure" mode operated prior to a gas concentration measurement, another one of which is a "gas concentration measure" mode actually operated during the gas concentration measurement. The control part 24 accepts an instruction to change operating mode(s) by an operation device (not shown) such as keyboard, mouse, and so on.

The control part 24 notifies an instruction to the laser diode driver 22 according to an instruction by the user to change the mode, so as to change the optical signal to be emitted from the laser diode 21. Specifically, in a case where instructed to operate in the "pre-measurement" mode, the control part 24 notifies an instruction to the laser diode driver 22 to emit an optical signal having the absorption wavelength of water.

Further, in a case where a mode relating to "gas concentration measure" is instructed, the control part 24 notifies an instruction to the laser diode driver 22 to emit an optical signal for measuring the absorption of water, at first. Next, the control part 24 determines whether or not to transmit the optical signal for measuring the gas concentration, based on a result of the condensation determination from the receiving apparatus 12. Specifically, if the result is "no condensation", the control part 24 notifies an instruction to the laser diode driver 22 such that the optical signal for measuring the gas concentration by the laser diode 21. On the other hand, if the result is "condensation exists", the control part 24 does not notify the instruction to emit the optical signal for measuring the gas concentration.

The storage part 25 is formed of a with storage medium such as ROM (Read Only Memory), RAM (Random Access Memory), HDD (Hard Disk Drive), and is a means to record information or data necessary for the operation of the transmitting apparatus 11.

In FIG. 2, there are illustrated one set of laser diode 21 and laser diode driver 22, however, which does not mean to limit the number of the laser diode or the laser diode driver included in the transmitting apparatus 11. A plurality of laser diodes or laser diode drivers may be included, according to objects (kinds of gas) to be measured. Or, in place of the laser diode 21 that covers multiple wavelengths, a laser diode for measuring the gas concentration and another laser diode for measuring the absorbance of water may be provided, respectively.

Subsequently, a configuration of the receiving apparatus 12 will be described. The receiving apparatus 12 comprises a light collector 31, a light detection part 32, a discrimination part 33, a control part 34 and a storage part 35.

The optical signal emitted from the transmitting apparatus 11 passes through the receiving surface 212 after passing through a gas containing region 221, and are collected using the light collector 31 to be received by the light detecting part 32. The light detecting part 32 is configured by such a device as photodiode, CCD (Charge Coupled Device), image sensor, which is a means to convert an optical signal into an electrical signal.

The discrimination part 33 calculates the absorbance of water based on the optical signal having the absorption wavelength of water transmitted from the transmitting apparatus 11. When the receiving apparatus 12 is operating in the "pre-measurement" mode, the discrimination part 33 notifies the calculated value of the absorbance of water to the control part 34.

When the receiving apparatus 12 is operating in the "gas concentration measurement" mode, the discrimination part 33 determines whether or not condensation exists on the transmitting surface 211 etc. Specifically, the discrimination part 33 determines whether or not condensation exists on the transmitting surface 211 and/or the receiving surface 212, based on the optical signal received by the light detection part 33 and the measurement value (humidity near the receiving apparatus 12) measured by the humidity measuring apparatus 14. The discrimination part 33 notifies a result of the condensation determination to the control part 34.

Further, the discrimination part 33 has a function to transmit a signal acquired from the light detection part 32 to the signal processing apparatus 13. Specifically, the discrimination part 33 transmits the signal for gas concentration measurement (the signal obtained by converting the optical signal for gas concentration measurement) to the signal processing apparatus 13. Details of the operation of the discrimination part 33 (in particular, the details of the condensation determination) will be described later together with the operation of the system.

The control part 34 is configured by a CPU or the like, and controls of the receiving apparatus 12 in its entirety. The control part 34, in the same manner as the control part 24 in the transmitting apparatus 11, performs controlling accompanying an operating mode switching of the gas detection system 10. Specifically, in a case where the operating mode is at "pre-measurement", the control part 34 outputs to exterior the absorbance of water calculated by the discrimination part 33. For example, the control part 34 outputs the absorbance calculated using such a storage medium like USB (Universal Serial Bus) storage medium (by which means, user can grasp the absorbance of water).

In a case where the operating mode is at "gas concentration measurement", the control part 34 notifies the result of condensation determination determined by the discrimination part 33, to the transmitting apparatus 11 and the signal processing apparatus 13. For example, the control part 34 notifies the result of condensation determination to the transmitting apparatus 11 and the signal processing apparatus 13 by means of a network, and so on.

The storage part 35 stores information necessary for the operation of the receiving apparatus 12. More specifically, the storage part 35 stores "humidity/absorbance information" that defines the relationship between the humidity and the absorbance of water. Details of the information will be described later.

It is also desirable that the receiving surface 211 of the receiving apparatus 12 is sealed with glass or like, just like in the case of the transmitting surface 211 of the transmitting apparatus 11, to prevent a change of a location-ship of elements in the receiving apparatus 11 caused by a contact from exterior, and to prevent status change of the surface caused by external situation. Further, a plurality of light detection parts 32 may also be provided depending on the object(s) to be measured.

The control part 24 in the transmitting apparatus 11, the control part 34 in the receiving apparatus 12 and the discrimination part 33 can be realized by a CPU executing programs stored in the storage part 25 or the storage part 35. Also, the program can be updated either by downloading via a network, or by using a storage medium storing the program.

Next, the operation of the gas detection system according to the first example embodiment will be described. As described above, the gas detection system has two operating modes ("pre-measurement" and "gas concentration measurement"). Operating mode "pre-measurement" is a mode for collecting the "humidity/absorbance information" in advance for enabling the determination of condensation by the discrimination part 33.

First, the operation at the "pre-measurement" mode in the first example embodiment will be described.

PRE-MEASUREMENT

Before measuring gas concentration, a system administrator measures the relationship between the humidity and the absorbance of water within a system including the monitoring region 201 using the transmitting apparatus and the receiving apparatus 12 of the gas detection system 10, and generates the "humidity/absorbance information". The generated information "humidity/absorbance information" is stored in the storage part 35 of the receiving apparatus 12, so that the discrimination part 33 can access the information.

Figure 3:
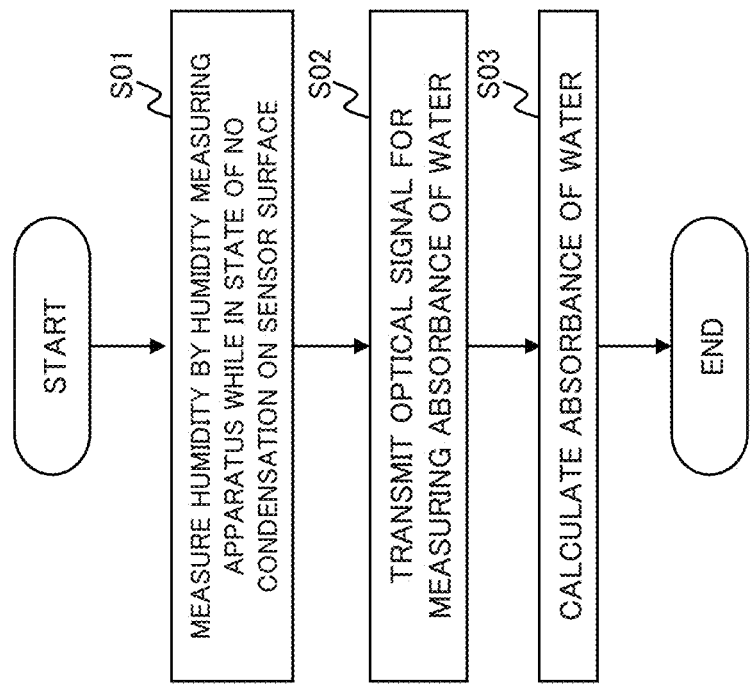
FIG. 3 illustrates a flowchart to show an example of operation of a gas detection system in pre-measurement mode.

FIG. 3 illustrates a flowchart to show an example of the operation of the gas detection system 10 in the "pre-measurement" operating mode.

First, a humidity is measured by the humidity measuring apparatus 14 in a state where there is no condensation on the sensor surface (the transmitting surface 211, the receiving surface 212) (step S01). That is, after (based on) confirming that there is no condensation on the transmitting surface 211 or the receiving surface 212, the humidity of an environment surrounding the transmitting apparatus 11, the receiving apparatus 12 or the monitoring region 201 is measured using the humidity measuring apparatus 14.

Next, an optical signal for measuring the absorbance of water is transmitted from the transmitting apparatus 11 (step S02), and the discrimination part 33 of the receiving apparatus 12 calculates the absorbance of water (step S03).

As described above, in the gas detection system 10, the attenuation of light due to water is measured in advance. For example, the wavelength of 1.4 μm is known as the wavelength absorbed by water, and the attenuation of light at the wavelength is measured by operating the transmitting apparatus 11 and the receiving apparatus 12. Also, as for physical quantity for grasping the attenuation of light, a non-dimensional amount of absorbance, which indicates a decrease in light intensity when light passes through an object, is usually used.

Figure 4A:
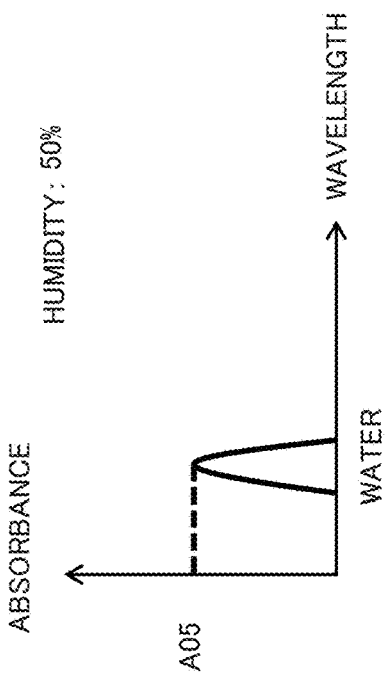
FIGS. 4A to D illustrate a figure to explain discrimination of condensation concerning the first example embodiment, respectively.
Figure 4C:
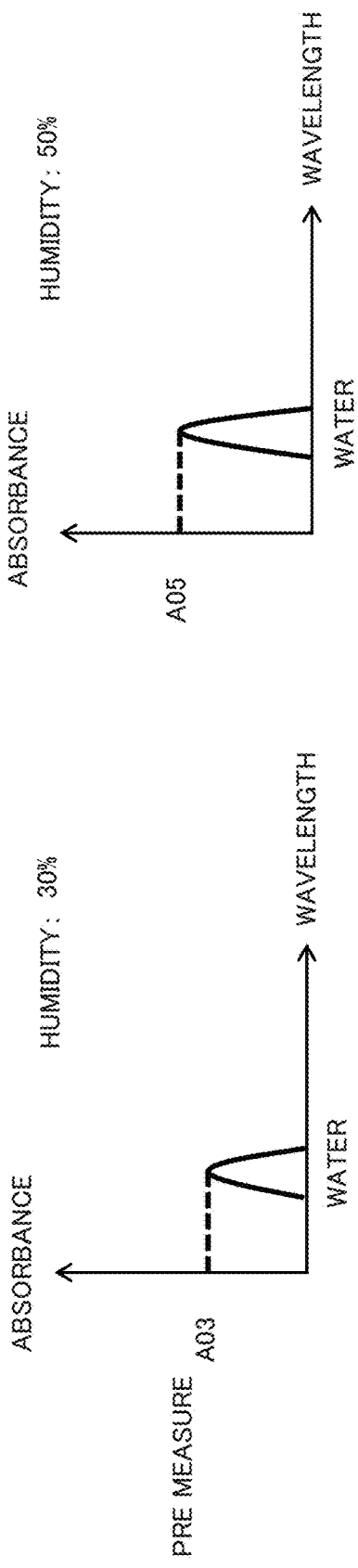
Figure 4B:
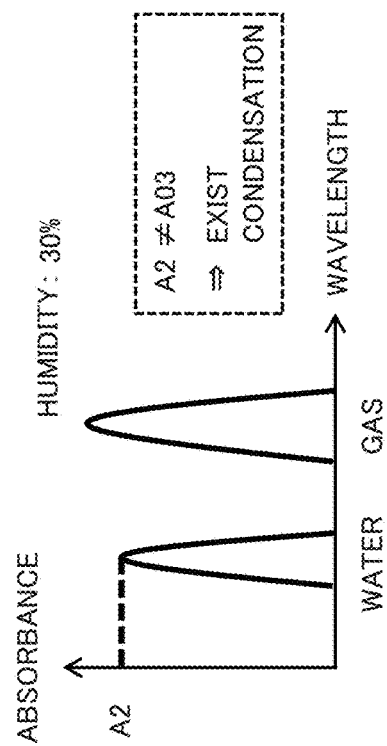

FIG. 4A and FIG. 4B illustrate the absorbance of water in the "pre-measurement" operating mode. In FIGS. 4A to 4D, horizontal axis represents wavelength, and vertical axis represents absorbance. For example, when the humidity is 30%, the corresponding absorbance is A03 as shown in FIG. 4A. Further, for example, when the humidity is 50%, the corresponding absorbance is A05 as shown in FIG. 4B, which means that the value of the absorbance changes. In the operation in the mode "pre-measurement", relationship between the humidity and the absorbance of water is measured while changing the humidity to generate the "humidity/absorbance information" (see FIG. 5). The generated "humidity/absorbance information" is stored in the storage part 35 in the receiving apparatus 12.

Gas Concentration Measurement

Next, the operation in the "gas concentration measurement" operating mode in the first example embodiment will be described.

Figure 6:
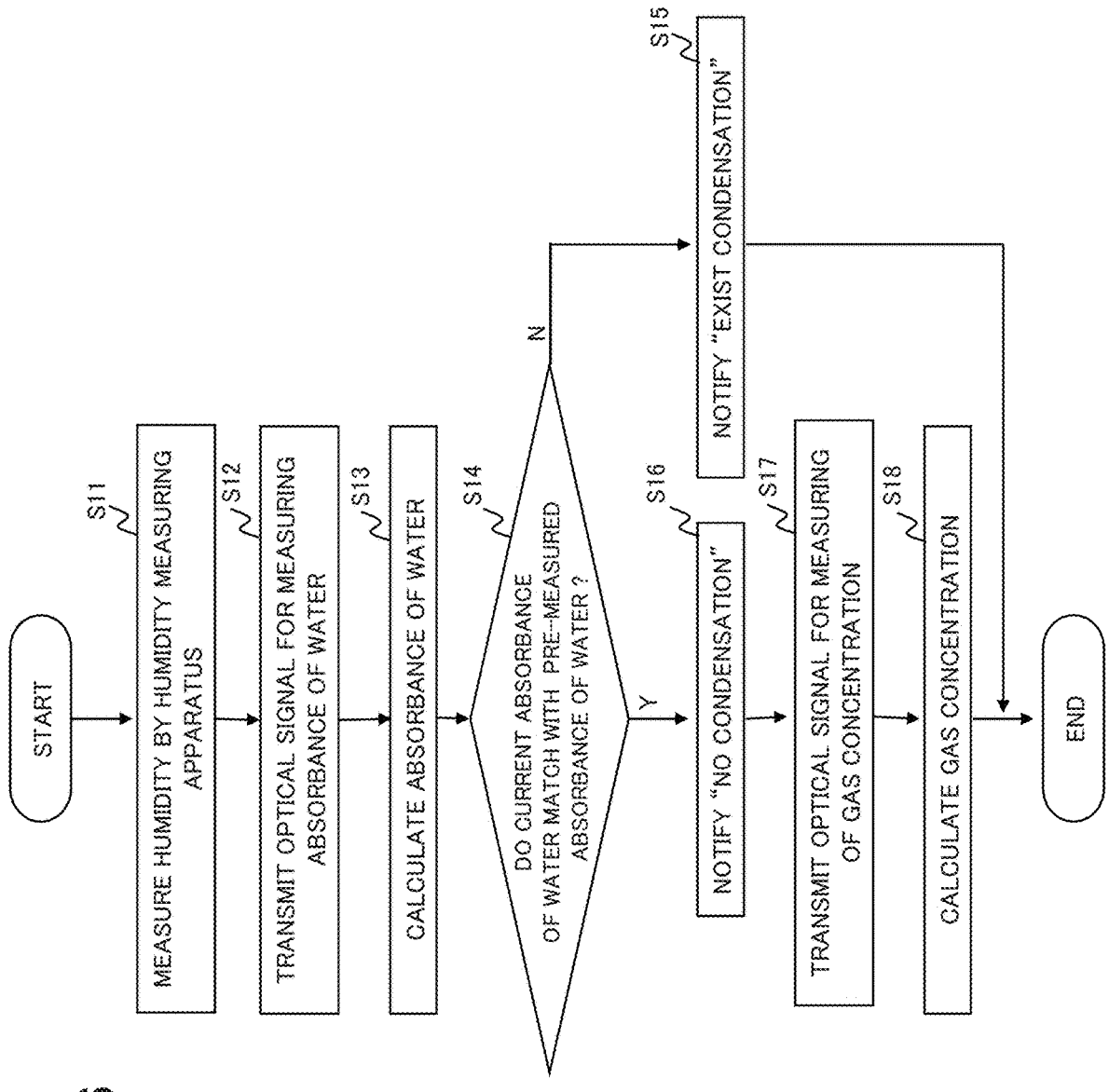
FIG. 6 illustrates a flowchart to show an operation of a gas detection system in gas concentration measurement mode.

FIG. 6 illustrates a flowchart to show an example of an operation of the gas detection system 10 in the operating mode of "gas concentration measurement".

At step S11, a humidity is measured by the humidity measuring apparatus 14, and the humidity measured is delivered to the receiving apparatus 12.

At step S12, the transmitting apparatus 11 transmits the optical signal measuring for the absorbance of water.

The discrimination part 33 of the receiving apparatus 12 calculates the absorbance of water based on the optical signal transmitted from the transmitting apparatus 11 (step S13).

Thereafter, the discrimination part 33 refers to the "humidity/absorbance information" stored in the storage part 35, and acquires the absorbance of water corresponding to the humidity acquired at step S11 (acquire the absorbance of water measured by "pre-measurement", corresponding to the current humidity). Furthermore, the discrimination part 33 compares the absorbance of the pre-measured water with the absorbance of water at a current time (the absorbance of water measured at step S13), and check whether or not these values match. (Step S14).

If the both values do not match (No branch, at step S14), the discrimination part 33 determines that "condensation exists", and the control part 34 notifies the result to the transmission apparatus 11 and the signal processing apparatus 13 (step S15). In this case, the gas detection system determines that accurate gas concentration measurement is difficult due to condensation on the transmitting surface 211 or the like, and stops the gas concentration measurement.

If the both values match (Yes branch, at step S14), the discrimination part 33 determines that "no condensation", and the control part 34 notifies the result to the transmitting apparatus 11 and the signal processing apparatus 13 (step S16). In this case, the gas detection system determines that accurate gas concentration measurement is possible without condensation on the transmitting surface 211 or the like, and performs the gas concentration measurement operations at step S17 and thereafter.

At step S17, the transmitting apparatus 11 transmits an optical signal for gas concentration measurement. Concretely, driving current and temperature for the laser diode 21 are controlled by the laser diode driver 22, so that an optical signal for measuring gas concentration is emitted. For example, the laser diode 21 emits a continuous optical signal having a wavelength of 1.65 μm. The wavelength is known as a wavelength at which the absorbance of methane is large. The continuous optical signal emitted having the wavelength of 1.65 μm passes through the monitoring region 201 under the control of emitting angle by the light collector 23. During this process, the control part 24 adjusts a direction of the optical signal transmitted from the transmitting apparatus 11.

The receiving apparatus 12 receives the optical signal having the absorption wavelength of a gas, and outputs information obtained by converting the optical signal to the signal processing apparatus 13. The signal processing apparatus 13 calculates the absorbance of the gas and calculates the gas concentration (at step S18). That is, in the monitoring region 201, the optical signal (continuous optical signal with the wavelength of 1.65 μm) is attenuated according to the concentration of methane, which is present in the system. The attenuated optical signal is collected to the light detection part 32 by the light collector 31 in the receiving apparatus 12. The light detection part 32 receives the attenuated optical signal. The optical signal received by the light detection part 32 is transmitted to the signal processing apparatus 13 via the discrimination part 33, and the signal processing apparatus 13 calculates concentration of the gas based on the attenuation amount of the optical signal.

Thus, at a timing of measurement of the gas concentration, the transmitting apparatus 11 transmits to receiving apparatus 12, the optical signal for measuring gas concentration (for example, continuous optical signal with the wavelength of 1.65 μm) as well as an optical signal for measuring the absorbance of water. Namely, at a timing of measurement of gas concentration, the absorbance corresponding to the kind of measurement objective gas such as methane, as well as the absorbance of water are measured together. Upon acquiring the humidity at the timing of measurement of gas concentration from the humidity measuring apparatus 14, the discrimination part 33 acquires the absorbance of water acquired by referring to "humidity/absorbance information" collected (and recorded) at the "pre-measurement" mode. Then, the discrimination part 33 determines whether or not condensation exists by comparing the absorbance of water at a timing of measurement of the gas concentration and the absorbance of water acquired by referring to the "humidity/absorbance information". That is, the discrimination part 33 determines the existence of condensation based on the humidity acquired by the humidity measuring apparatus 14, and the absorbance of water calculated from the optical signal received by the light detection part 32. In other words, the criterion of discrimination part 33 for the condensation determination is based on the difference between an absorbance at the absorption wavelength of water (the wavelength absorbed by water) obtained in a state of no condensation existing in at least one region of regions the optical signal passes through, and an absorbance at the absorption wavelength of water obtained at a timing of measuring the gas concentration.

Figure 4D:
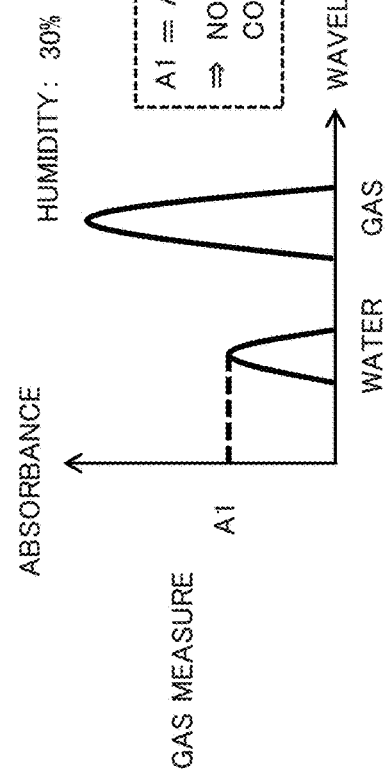

For example, as shown in FIG. 4C, in a case where the absorbance A1 of water while in operation mode of "gas concentration measurement" matches the absorbance A03 of water (absorbance A03 of water previously measured) derived from the "humidity/absorbance information", it is determined that "no condensation" exists. On the other hand, as shown in FIG. 4D, in a case where the absorbance A2 of water while in the operating mode of "gas concentration measurement" is different from the absorbance A03 of water previously measured, it is determined that "condensation exists". Note that in the above process of condensation determination, the expression: "two absorbances of water match" means that two absorbances of the water substantially match, and the difference between the two absorbances of water is within a predetermined range.

Figure 7A:
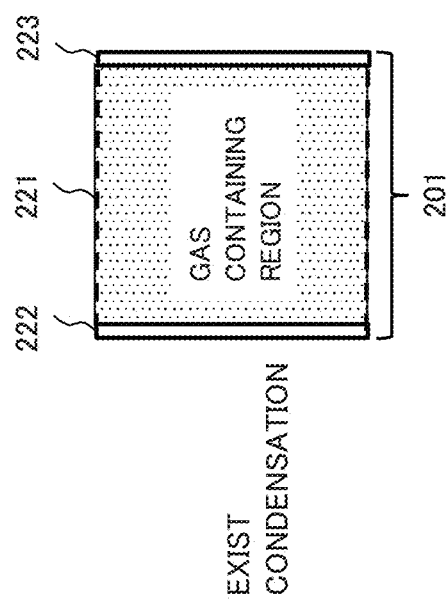
FIGS. 7A and 7B illustrate schematically a monitoring region concerning a first example embodiment, respectively.
Figure 7B:
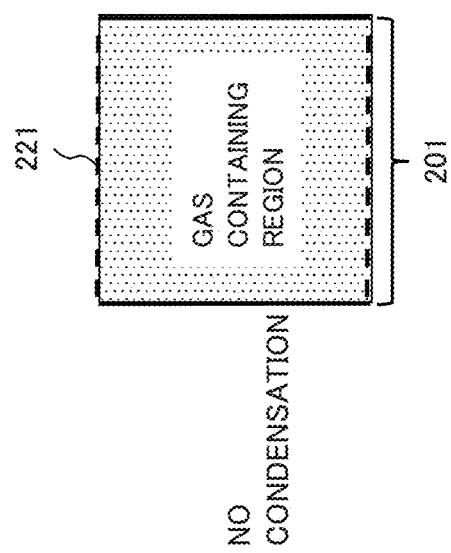

Next, the reason for the above determination will be described with reference to FIG. 7. FIGS. 7A and 7B. FIGS. 7A and 7B illustrate a view schematically showing the monitoring region 201 in the first example embodiment, respectively. As shown in FIG. 7A, the monitoring region 201 comprises a condensed transmitting surface 222 that has condensation on the transmitting surface 211, the gas containing region 221 that contains water vapor which occupies most of the monitoring region 201, and the condensed receiving region 223 that has condensation on the receiving surface 212.

After some moment elapsed, from a time no condensation existed on the transmitting surface 211 and the receiving surface 212 (during the "pre-measurement"), a case may occur in which condensation appears on the transmitting surface 211 and the receiving surface 212 (this is the case of occurrence of the condensed transmitting region (surface) 222 and/or the condensed receiving region (surface) 223). By operating the "pre-measurement" in a state of no occurrence of the condensed transmitting region 222 and the condensed receiving region 223, a relationship between the absorbance by water in air contained in the gas containing region 221 and the humidity can be obtained. The absorbance of water depends on the humidity, and varies, for example, as shown in FIG. 4A and FIG. 4B.

Next, when the system actually operates and the gas concentration measurement is performed, and when the condensed transmitting region 222 or the condensed receiving region 223 appeared, which departs from the previously calculated relationship between the humidity and the absorbance of water, an increase of the absorbance occurs due to the water content present in the condensed transmitting region 222 and the condensed receiving region 223. Therefore, in a case where the relationship between the humidity and the absorbance is out of the relationship from that at the pre-measurement, it is determined that "condensation exists" (FIG. 7A). And in a case where the relationship between the humidity and the absorbance remains without any change, it is determined to be "no condensation" (FIG. 7B)

In the first example embodiment, the example is described that the concentration of methane is detected using the optical signal with wavelength of 1.65 µm. However, it is not intended to limit the wavelength of the optical signal to be used, and a wavelength corresponding to another absorption spectrum of methane may be used as the wavelength of the optical signal. Alternatively, the absorption spectrum of gas molecules different from methane may be monitored at a wavelength other than 1.65 µm, to detect a gas other than methane. Furthermore, optical signals of multiple wavelengths may be used to detect multiple different types of gases.

As described above, in the gas detection system according to the first example embodiment, the absorbance of water is measured in advance, and by comparing the absorbance of water measured in advance with the absorbance of water at the timing of measurement of gas concentration, it is determined whether the transmitting surface 211 is condensed or not. As a result, following effects are achieved.

A first effect is that since it is not necessary to dispose a condensation detecting device that requires power for driving on the surface of the sensor to become in contact with gas, it is possible to determine the state of condensation while maintaining explosion proof.

A second effect is that above condensation detection apparatus is not required, so that the cost of a gas detection system can be reduced. That is, it is possible to realize gas detection in the monitoring region while determining the condensation of the sensors with simple configurations at low cost.

A third effect is that it enables to discriminate (or differentiate) the reason of change in absorbance, that is, between the decrease in the amount of light due to condensation, and the change in absorbance due to humidity in the monitoring region. If a gas detection system is not equipped with a condensation detector, it is not possible to discriminate the change in absorbance caused by the decrease in the amount of received light due to condensation on the sensor surface and the change caused by the influence of the humidity in the monitoring region. However, in the gas detection system according to the first example embodiment, since the occurrence of condensation on the sensor surface can be determined, it is possible to take action such as wiping the sensor surface, especially when the amount of received light decreases, thereby leading to recover the decrease in the amount of received light at an appropriate timing.

SECOND EXAMPLE EMBODIMENT

Subsequently, a second example embodiment will be described in detail with reference to the drawings.

Figure 8:
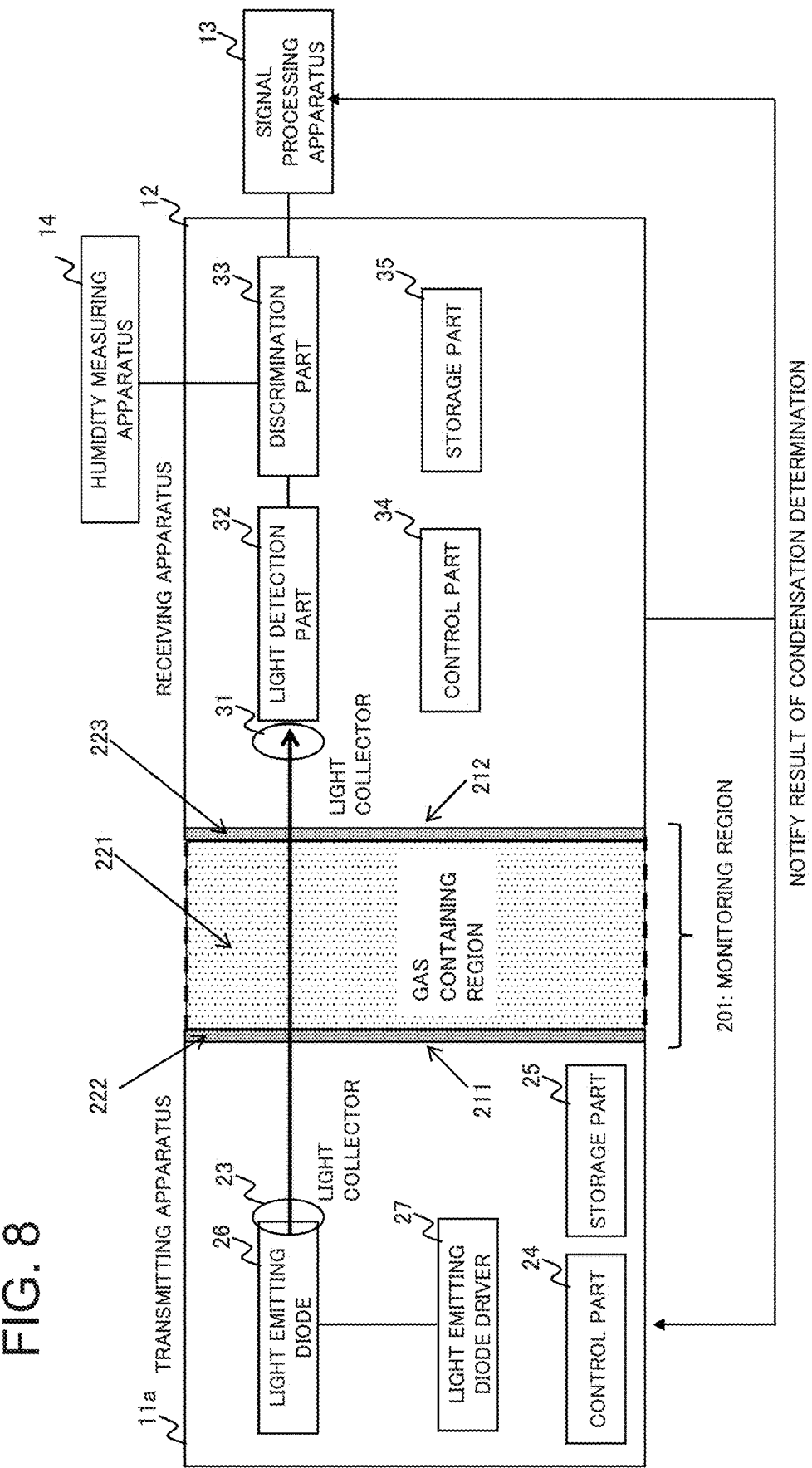
FIG. 8 illustrates a block diagram to show an example configuration of a gas detection system relating to a second example embodiment.

In a gas detection system 10a according to the second example embodiment, a light transmitting diode (LED: Light Emitting Diode) is used as a light source. Specifically, as a replacement of the laser diode 21 which is referred to in the first example embodiment, the light emitting diode 26 is used in the transmitting apparatus 11a (see FIG. 8). Further, as a replacement of the laser diode driver 22, a light emitting diode driver 27 is also used, to control the light emitting diode as a light source.

As described above, by using the light emitting diode as a light source, emission angle of the optical signal become large compared to the case of using laser diode. As a result, strictness of an optical axis adjustment become eased, and adjustment of the emitting direction becomes easier.

THIRD EXAMPLE EMBODIMENT

Subsequently, a third example embodiment will be described in detail with reference to the drawings.

In the first example embodiment, the transmitting apparatus 11 and the receiving apparatus 12 are equipped in separate casings (separate apparatuses). In the third example embodiment, the transmitting apparatus 11 and the receiving apparatus 12 are accommodated in the same casing.

Figure 9:
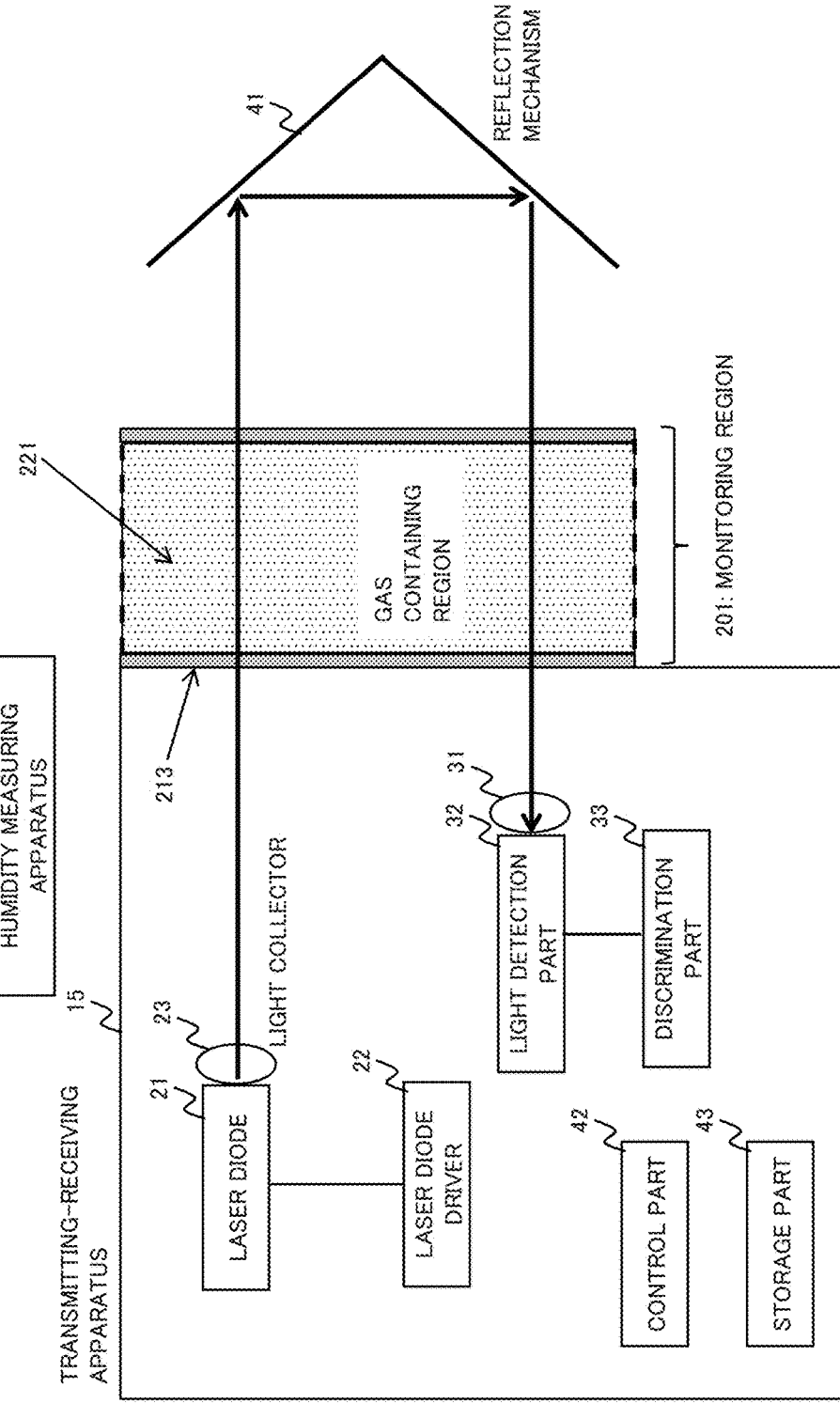
FIG. 9 illustrates a block diagram to show an example configuration of a gas detection system relating to a third example embodiment.

FIG. 9 illustrates a block diagram to show an example of a configuration of a gas detection system 10b according to the third example embodiment. By referring to FIG. 9, various elements included in the transmitting apparatus 11 and the receiving apparatus 12 described in the first example embodiment (e.g., the laser diode 21 as a light source, the light detection part 32, the discrimination part 33) are accommodated in one casing, so that, an transmitting-receiving apparatus 15 is configured. The elements included in the transmitting-receiving apparatus 15 are basically the same as the elements described in the first example embodiment, so that the description will be omitted. Further, the gas detection system 10b according to the third example embodiment comprises a reflecting mechanism 41, by which the optical signal emitted from the laser diode 21 is reflected back to a direction toward the casing of the transmitting-receiving apparatus 15.

Operations of the transmitting-receiving apparatus 15 which are different from the operations of the gas detection system described in the first example embodiment are described as follows.

The optical signal emitted from the laser diode 21 passes through the light collector 23, also passes out of the transmitting-receiving surface 213. Then the optical signal passes through the monitoring region 201 (gas containing region 221), and reflected back in the direction to the transmitting-receiving apparatus 15 by the reflection mechanism 41 configured using a mirror, and so on. The reflected optical signal passes through the monitoring region 201 again, and passes through the transmitting-receiving surface 213 and the light collector 31, and the light detecting part 32 detect the optical signal. Meanwhile, the humidity measuring apparatus 14 is disposed near the transmitting-receiving apparatus 15.

The entire operation of the transmitting-receiving apparatus 15 is realized by the control part 42, and information (for example, "humidity/absorbance information") necessary for the operation of the transmitting-receiving apparatus 15 is stored in the storage part 43.

As described above, in the gas detection system 10b according to the third example embodiment, the transmitting function and the receiving function of the optical signal are accommodated in the same casing. Since the reflection mechanism 41 does not require a power feeding mechanism, it is possible to reduce power consumption of the entire system as compared to the first example embodiment. In addition, since the optical signal passes through the monitoring region 201 in a reciprocating manner, the reliability of the detection of gas concentration is enhanced. Furthermore, the surface on which condensation can occur is limited to the transmitting-receiving surface 213, so that location of the humidity measuring apparatus 14 can be easily disposed in the vicinity of the surface of condensation. Therefore, the accuracy of determining the reason of the change in absorbance, that is, whether the decrease in the amount of light is due to condensation, or the change in absorbance due to the humidity in the monitoring region, can be improved more.

FOURTH EXAMPLE EMBODIMENT

Subsequently, a fourth example embodiment will be described in detail with reference to the drawings.

Figure 10:
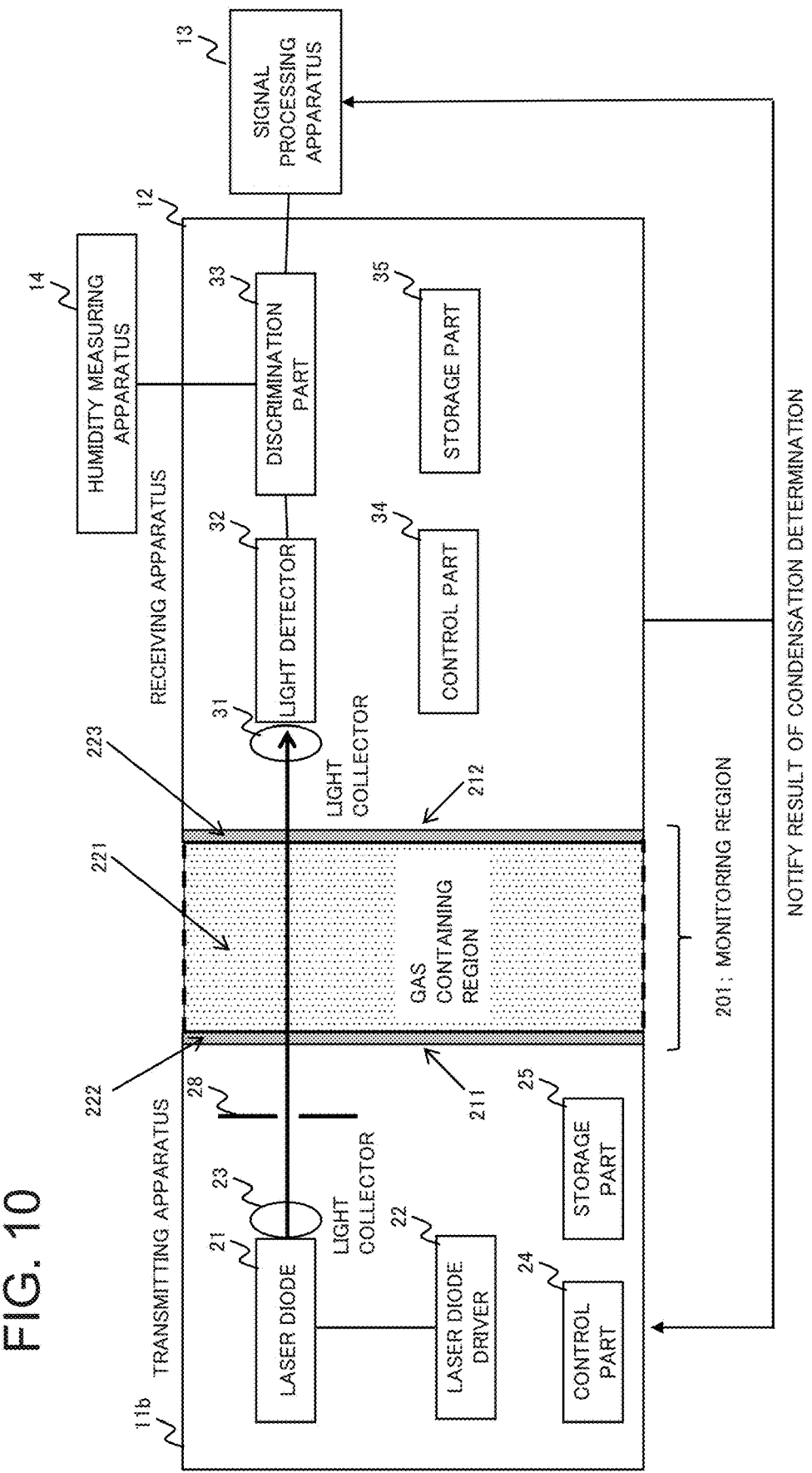
FIG. 10 illustrates a block diagram to show an example configuration of a gas detection system relating to a fourth example embodiment.

FIG. 10 illustrates a block diagram to show a configuration example of a gas detection system 10c according to the fourth example embodiment.

In the first example embodiment, a mechanism for controlling an optical signal is not provided behind (downstream of) the light collector 23 in the transmitting apparatus 11. In the fourth example embodiment, a light signal diameter adjustment mechanism 28 is disposed after the light collector 23 inside the transmitting apparatus 11b. For example, the light signal diameter adjusting mechanism 28 is a light shielding plate capable of changing diameter of a hole (or aperture) for narrowing incident light. The mechanism can control the size of diameter of the optical signal to be transmitted.

As described above, in the gas detection system 10c according to the fourth embodiment, the diameter of the light signal to be transmitted can be adjusted. Therefore, it is possible to obtain the result of the separation of the change of the absorbance caused by the decrease of the light receiving amount due to the condensation and the influence of the humidity of the monitoring region together with the dependency of the size of the diameter of the optical signal. As a result, the accuracy of discrimination can be further improved.

FIFTH EXAMPLE EMBODIMENT

Subsequently, a fifth example embodiment will be described in detail with reference to the drawings.

Figure 11:
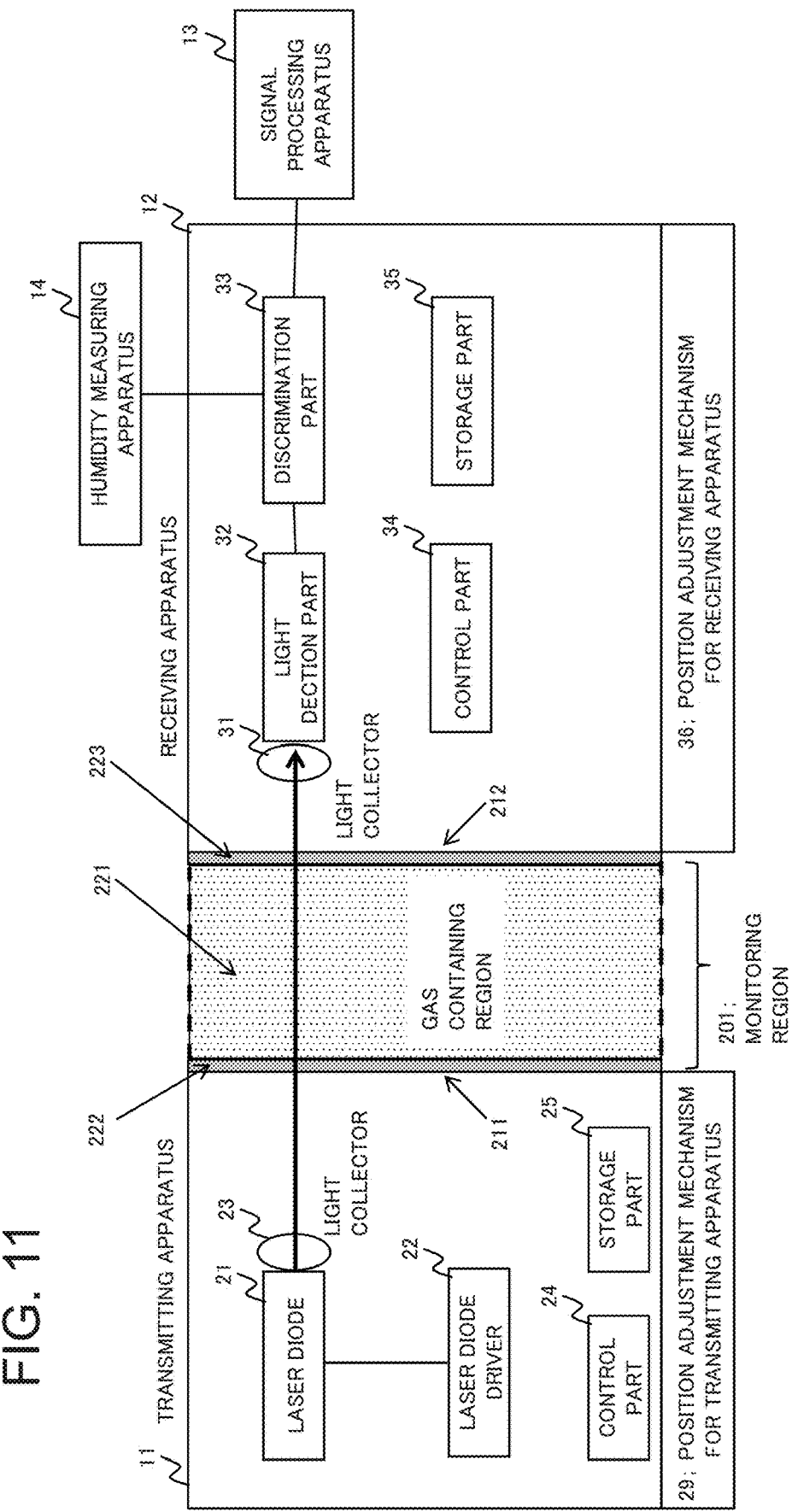
FIG. 11 illustrates a block diagram to show an example configuration of a gas detection system relating to a fifth example embodiment.

FIG. 11 illustrates a block diagram to show a configuration example of a gas detection system 10d according to the fifth example embodiment.

In the first example embodiment, no position adjustment mechanism for the transmitting apparatus 11 and the receiving apparatus 12 is provided. In the fifth example embodiment, a position adjustment mechanism for transmitting apparatus 29 and a position adjustment mechanism for receiving apparatus 36 for adjusting position are provided to the transmitting apparatus 11 and the receiving apparatus 12, respectively. Each of the position adjusting mechanisms for transmitting apparatus 29, the position adjusting mechanism in receiving apparatus 36 is a mechanism, that is at least disposed in an opposite facing direction (each of which are located on a rail to move on the rail), and by any of the position adjusting mechanisms, distance between the transmitting apparatus 11 and the receiving apparatus 12 can be changed.

Alternatively, in a case where the transmitting-receiving apparatus 15 using the reflection mechanism 41 described in the third example embodiment, a position adjustment mechanism is disposed for each of the transmitting-receiving apparatus 15 and the reflection mechanism 41, so that distance between the transmitting-receiving apparatus 15 and the reflection mechanism 41 can be changed.

As described above, in the gas detection system 10d according to the fifth example embodiment, position of the transmitting apparatus 11 and the receiving apparatus can be adjusted. For this reason, it is possible to change only the distance of the gas containing region 221 while keeping the condensation amount at constant. As a result, the change in absorbance caused by the decrease in the light reception amount and the influence of the humidity in the monitoring region 201 can be determined with higher accuracy.

SIXTH EXAMPLE EMBODIMENT

Subsequently, a sixth example embodiment will be described in detail with reference to the drawings.

Figure 12:
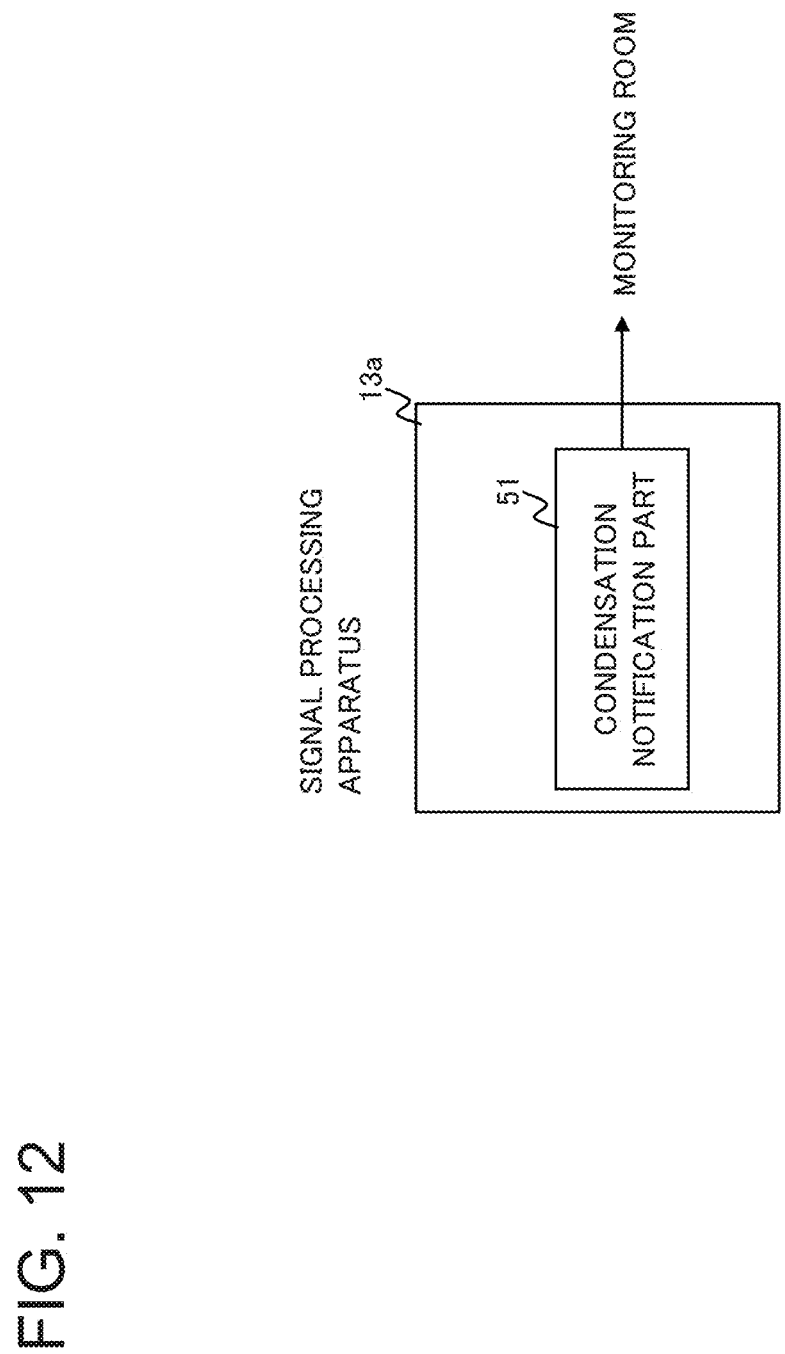
FIG. 12 illustrates a block diagram to show an example configuration of a signal processing apparatus relating to a sixth example embodiment.

FIG. 12 illustrates a block diagram to show an example of a configuration of a signal processing apparatus 13a according to the sixth example embodiment. By referring to FIG. 12, a condensation notification part 51 may be included in the signal processing apparatus 13a to transmit the result of condensation determination to a monitoring room or the like. The condensation notification part 51 is a means to notify in a case where condensation exists, to an operator(s) in the monitoring room.

As described above, the result of condensation determination is determined by providing the information processing function in the signal processing apparatus 13a, which is notified to the monitoring room, etc. and in particular when the amount of received light is reduced. These lead to an operation such as to wipe the sensor surface, which is linked to an action to be taken, and by that action, the decrease in the amount of the receiving light can be recovered at an appropriate timing.

Configurations and operations of the gas detection system described in the above example embodiments are illustrative, and variable modifications are possible. For example, the function of the signal processing apparatus 13 may be included in the receiving apparatus 12.

In the above example embodiment, in the operating mode of "pre-measurement", by changing the humidity in the system "humidity/absorbance information" as shown in FIG. 5 has been obtained. However, in particular in a case where from the absorbance of water in specific humidity in a state of no condensation existing, the absorbance of water in other humidity are estimable (or calculable), it is not necessary to obtain absorbance information by humidity by changing humidity in the system. Alternatively, since there is a proportional relationship between the humidity and the absorbance of water, by using several measurement results (combination of humidity and absorbance) with the humidity and the absorbance of water, the absorbance of water at unmeasured humidity may be estimated. That is, the detailed information as shown in FIG. 5 may not be prepared in advance.

In the above example embodiment, the case of determining whether or not condensation exists at the time of gas concentration measurement (at steps S11 to S14 in FIG. 6) has been described, but the determination whether or not condensation exists may be periodically performed while the gas detection system is in operation. Alternatively, it may be performed intensively in a predetermined time zone (for example, a time zone in which condensation easily occurs).

In the above example embodiment, it is described that the gas concentration is changed due to condensation or it is determined whether the gas concentration is changed due to the humidity change in the monitoring region 201, and the gas concentration measurement is not performed in the case of "condensation exists". However, it is a matter of course that the result of condensation determination may be reflected in measuring gas concentration. Specifically, the influence of condensation on measuring of gas concentration may be measured in advance, and the gas concentration may be corrected if there exists condensation.

Further, while a plurality of steps in flows used in the above description are executed in order of a sequence, the execution order of steps performed in each of the example embodiments, the order of the description is not restricted. In each example embodiment, for example, the order of illustrated steps can be changed without causing any problem in content, such as executing each process in parallel. Moreover, in each example embodiment mentioned above, can be combined within a range as far as the contents do not contradict.

Some or all of the above embodiments may be described as in the following modes, but without limitation thereto.

Mode 1

There is provided a gas detection system according to the first aspect described above.

Mode 2

The gas detection system according to mode 1, wherein, the light source of the transmitting apparatus emits an optical signal having an absorption wavelength of a predetermined type of gas in atmosphere;
the receiving apparatus receives the optical signal having the absorption wavelength of the gas, and outputs information corresponding to the optical signal having the absorption wavelength of the gas,
the gas detection system further comprising:
a signal processing apparatus that measures concentration of the predetermined kind of gas, based on the output information from the receiving apparatus, corresponding to the optical signal having the absorption wavelength of the gas.

Mode 3

The gas detection system according to mode 1 or 2, wherein, the discrimination part determines whether or not condensation exists based on the humidity measured by the humidity measuring apparatus and the absorbance at the absorption wavelength of water calculated by the optical signal received by the light detection part.

Mode 4

The gas detection system according to mode 3, wherein, the discrimination part determines whether or not condensation exists based the criterion on the difference between the absorbance of the absorption wavelength of water obtained in a state of no condensation existing in at least one region of regions where the optical signal passes, and the absorbance of the absorption wavelength of water obtained at a timing of measuring gas concentration.

Mode 5

The gas detection system according to any one of modes 1 to 4, wherein, the transmitting apparatus comprises a light diameter adjustment mechanism that adjust diameter of the optical signal transmitted.

Mode 6

The gas detection system according to any one of modes 1 to 5, wherein, the transmitting apparatus and/or the receiving apparatus comprises a position adjustment mechanism that can change distance between the transmitting apparatus and the receiving apparatus.

Mode 7

The gas detection system according to any one of modes 1 to 5, further comprising,
a transmitting-receiving apparatus in place of the transmitting apparatus and the receiving apparatus comprises the light source, the light detection part,
and the discrimination part included in a same casing, and a reflection mechanism that reflects the optical signal emitted from the light source back to the direction of the casing of the transmitting-receiving apparatus, wherein,
the transmitting-receiving apparatus receives the reflected optical signal by the light detection part.

Mode 8

The gas detection system according to mode 7, wherein, the transmitting-receiving apparatus and/or the reflecting mechanism comprises a position adjustment mechanism that can change distance between the transmitting-receiving apparatus and the reflecting mechanism.

Mode 9

The gas detection system according to any one of modes 1 to 6, further comprising,
a light collector that controls the emitting angle of the optical signal emitted from the light source in the transmitting apparatus, and
a light collector that collects the optical signal transmitted from the transmitting apparatus in the receiving apparatus.

Mode 10

The gas detection system according to any one of modes 1 to 9, wherein, the light source emits the optical signal having a wavelength, at which water absorbance is large.

Mode 11

The gas detection system according to any one of modes 1 to 10, wherein,
the light source is a laser diode or a light emission diode, and the light detection part is configured including a photodiode(s).

Mode 12

The gas detection system according to any one of modes 1 to 11, wherein, the discrimination part notifies to a monitoring room according to a result of the condensation determination.

Mode 13

There is provided a gas detection method according to the second aspect described above.

Mode 14

A receiving apparatus, comprising,
a light detection part that receives an optical signal transmitted by a transmitting apparatus, which comprises a light source having a plurality of wavelengths, and,
a discrimination part that determines whether or not condensation exists in at least one region of regions where the optical signal passes, based on a humidity measured by a humidity measuring apparatus and a light intensity of the optical signal received by the light detection part.

Mode 15

There is provided a gas detection program according to the third aspect described above.

The mode described as modes 13 to 15 can be expanded to the modes described as modes 2 to 12, similarly to the modes shown in mode 1.

The disclosure of the above-mentioned patent literatures is incorporated herein by reference. Within the ambit of the entire disclosure of the present invention (including the claims), modifications and adjustments of the example embodiment are possible based on the fundamental technical concept of the invention. In addition, various combinations or selections of various disclosed elements (including each element of each claim, each element of each example embodiment, each element of each drawing, etc.) are possible within the ambit of the entire disclosure of the present invention. That is, the present invention of course includes various modifications and alterations that can be made by those skilled in the art according to the entire disclosure and technical concept. In particular, with regard to the numerical ranges described herein, it should be understood that any numerical value or small range falling within the relevant range is specifically described even if it is not otherwise explicitly described.

REFERENCE SIGNS LIST 10, 10a to 10d: gas detection system
11, 11a, 11b, 102: transmitting apparatus
12, 103: receiving apparatus
13, 13a: signal processing apparatus
14, 101: humidity measuring apparatus
15: transmitting-receiving apparatus
21: laser diode
22: laser diode driver
23, 31: light collector
24, 34, 42: control part
25, 35, 43: storage part
26: light emitting diode
27: light emitting diode driver
28: optical signal diameter adjustment mechanism
29: position adjustment mechanism for transmitting apparatus
32, 111: light detection part
33, 112: discrimination part
36: position adjustment mechanism for receiving apparatus
41: reflection mechanism
51: condensation notification part
201: monitoring region
211: transmitting surface
212: receiving surface
213: transmitting-receiving surface
221: gas containing region
222: condensed transmitting surface
223: condensed receiving surface

What is claimed is:

1. A gas detection system, comprising:
a humidity measuring apparatus that measures humidity;
a transmitting apparatus that includes a light source which emits an optical signal of a plurality of wavelengths;
a receiving apparatus including:
a light detection part that receives the optical signal from the transmitting apparatus;
a discrimination part that determines whether or not condensation exists in at least one region of regions where the optical signal passes, based on the humidity measured by the humidity measuring apparatus and a light intensity of the optical signal received by the light detection part.

2. The gas detection system according to claim 1, wherein:
the light source of the transmitting apparatus emits an optical signal having an absorption wavelength of a predetermined kind of gas in atmosphere;
the receiving apparatus receives the optical signal having the absorption wavelength of a predetermined kind of gas, and outputs information corresponding to the optical signal having the absorption wavelength of the predetermined kind of gas,
the gas detection system further comprising:
a signal processing apparatus that measures concentration of the predetermined kind of gas, based on the information outputted by the receiving apparatus corresponding to the optical signal having the absorption wavelength of the predetermined kind of gas.

3. The gas detection system according to claim 1, wherein:
the discrimination part that determines whether or not condensation exists based on the humidity measured by the humidity measuring apparatus, and the absorbance at the absorption wavelength of water calculated by the light detection part in the receiving apparatus.

4. The gas detection system according to claim 3, wherein the discrimination part that determines whether or not condensation exists, based on a criterion for determination:
whether or not an absorbance preliminarily obtained at the absorption wavelength of water in a state of no condensation existing in at least one region of regions where the optical signal passes, is different from an absorbance at the absorption wavelength of water at a time of measuring gas concentration.

5. The gas detection system according to claim 1, wherein the transmitting apparatus comprises:
an optical signal diameter adjustment mechanism that adjusts diameter of the optical signal.

6. The gas detection system according to claim 1, wherein the transmitting apparatus and/or the receiving apparatus comprises:
a position adjustment mechanism that can change distance from the transmitting apparatus to the receiving apparatus.

7. The gas detection system according to claim 1, further comprising:
a transmitting-receiving apparatus in place of the transmitting apparatus and the receiving apparatus, comprising at least the light source, the light detection part and the discrimination part in a same casing; and
a reflection mechanism that reflects the optical signal emitted from the light source back to the casing, wherein:
the transmitting-receiving apparatus receives the optical signal reflected by the reflection mechanism at the light detection part.

8. The gas detection system according to claim 7, comprising:
a position adjustment mechanism that can change distance from the transmitting-receiving apparatus to the reflecting mechanism.

9. A gas detection method in a gas detection system, wherein the gas detection system comprises a humidity measuring apparatus that measures humidity, and a transmitting apparatus that includes a light source which emits an optical signal having a plurality of wavelengths, the method comprising:
measuring humidity;
receiving the optical signal from the transmitting apparatus;
determining whether or not condensation exists in at least one region of regions where the optical signal passes, based on the humidity measured and a light intensity of the optical signal received.

10. A computer readable non-transient recording medium storing a program, causing a computer to perform processing for a receiving apparatus that comprises a light detection part which receives an optical signal from a transmitting apparatus that comprises a light source emitting an optical signal of a plurality of wavelengths,
the program comprising a processing of:
determining whether or not condensation exists in at least one region of regions where the optical signal passes, based on a humidity measured by a humidity measuring apparatus, and a light intensity of the optical signal received by the light detection part.

* * * * *